United States Patent [19]

Proulx et al.

[11] Patent Number: 5,246,598
[45] Date of Patent: Sep. 21, 1993

[54] DESTRUCTION OF CYANIDE AND OTHER POLLUTANTS IN AQUEOUS SOLUTIONS

[75] Inventors: Christopher R. Proulx, Piscataway; Jaganmay Chattopadhyay, Paramus; Wilfried Eul, Ramsey, all of N.J.; Gregg Vickell, Waterdown, Canada

[73] Assignee: Degussa Corporation, Ridgefield Park, N.J.

[21] Appl. No.: 993,593

[22] Filed: Dec. 22, 1992

[51] Int. Cl.$^5$ .................................. C02F 1/58
[52] U.S. Cl. ........................ 210/759; 210/763; 210/766; 210/904
[58] Field of Search ............ 210/742, 743, 759, 763, 210/766, 904

[56] References Cited

U.S. PATENT DOCUMENTS 3,617,567  11/1971  Mathre .............................. 210/904
4,743,381  5/1988   Bull ................................... 210/759
4,751,005  6/1988   Mitsui et al. ....................... 210/759
4,786,418  11/1988  Garg et al. ......................... 210/763
4,793,933  12/1988  Rostoker et al. .................... 210/904
5,093,007  3/1992   Domville ............................ 210/759

*Primary Examiner*—Thomas Wyse
*Attorney, Agent, or Firm*—Beveridge, DeGrandi, Weilacher & Young

[57] ABSTRACT

A method is disclosed for detoxifying an aqueous waste solution containing cyanide. The method involves adding a source of silicon oxide to the cyanide containing aqueous waste solution in a concentration of 0.001 to 10 g silicon dioxide/liter aqueous waste solution, at an alkaline pH and a temperature of from 10° to 100° C. Hydrogen peroxide or another peroxygen compound is added in a sufficient quantity to convert the aqueous waste solution containing cyanide to an aqueous solution containing environmentally less toxic materials.

14 Claims, No Drawings

DESTRUCTION OF CYANIDE AND OTHER POLLUTANTS IN AQUEOUS SOLUTIONS

BACKGROUND AND INTRODUCTION

The present invention relates to a process for the detoxification of aqueous solutions containing cyanide and/or other oxidizable substances. The process utilizes a mixture of hydrogen peroxide or other peroxygen compounds and a source of silicon dioxide as catalyst.

Wastewater from a variety of industrial processes poses a serious problem to the environment because of the presence of components in the wastewater that are harmful to the environment. Effluents from a variety of industrial processes often contain cyanide in various forms, such as cyanide and cyanide complexed with other toxic metals or organic nitriles. The conversion of these toxic substances into nontoxic materials is of paramount importance before such wastewaters are discharged to the waterways in order to avoid serious damage to the environment and aquatic life, and to avoid an adverse impact on public health and safety.

It has been known for some time that one of the best known methods to destroy cyanide ions in aqueous wastewater solutions is by oxidizing it to harmless species with hydrogen peroxide. However, this process is usually fairly slow. Sometimes a catalyst is used, such as copper in the $Cu^{2+}$ state, in order to accelerate the rate of the reaction (U.S. Pat. No. 3,617,567). U.S. Pat. Nos. 4,416,786 and 4,851,129 also focused on lowering the consumption of peroxide per amount of cyanide destroyed. U.S. Pat. No. 4,996,715 discloses the use of phosphoric acid in a mixture with peroxide to detoxify slurries and high solids suspensions and solutions. This also would lower the consumption of peroxide per amount of cyanide destroyed.

In many situations, the greatest limiting factor on the use of hydrogen peroxide for the detoxification of a given wastewater is the reaction time and the overall cyanide removal effectiveness. Copper does accelerate the rate of reaction as a catalyst, however it is undesirable to add copper to a wastewater stream because copper is a toxic heavy metal. Heavy metals are strictly regulated in wastewater discharge permits. They are quite toxic to aquatic organisms. They can sometimes be difficult to remove from solution. Even after removal, a sludge containing heavy metal has to be disposed of. Therefore, using them adds much additional cost to the wastewater treatment process. In addition, in some situations the use of copper does not allow the cyanide to be destroyed to sufficiently low levels as required by the wastewater discharge permit.

Several researchers have tested silica or silicon dioxide as a catalyst for the oxidation of a subject compound by hydrogen peroxide:

Hoss et al., "Sulfur (IV) Oxidation by Hydrogen Peroxide in Aqueous Suspensions of $SiO_2$, $Al_2O_3$, $TiO_2$ and Zeolite", *Atmospheric Environment* (1991), Vol. 25A, No. 8, pp. 1715-1717, tested silicon dioxide or silica as a catalyst for the oxidation of sulfur IV to sulfur VI in their work. They found the reaction did not benefit from the presence of silicon dioxide, aluminum trioxide, titanium dioxide or type A zeolite.

Fischer and Hubert (U.S. Pat. No. 5,068,038) used silica to flocculate and adsorb organic halide pollutants after oxidation by hydrogen peroxide in the required presence of $Fe^{2+}$. They, in effect, carried out a Fenton's reagent type reaction and then flocculated a portion of the remaining organic materials on the surface of the silica.

However, the prior art does not suggest adding sodium silicate solution or silica to a waste sample which contains cyanide ion in order to catalyze the oxidation of the cyanide by hydrogen peroxide.

Surprisingly, the present invention discloses that a source of silicon dioxide (e.g., sodium silicate solution or silica), when added to a waste sample which contains cyanide ion, catalyzes the oxidation of the cyanide by hydrogen peroxide. The cyanide is destroyed in a fraction of the time in comparison to oxidation without silicate and about equal to or less than the rate as when copper is added. Furthermore, the cyanide is unexpectedly more completely destroyed, i.e. to lower final concentrations of cyanide, than when silicate is not used, and in some cases even when copper is used.

SUMMARY OF THE INVENTION

It is an object of the present invention to provide a process for detoxifying cyanide-containing aqueous solutions.

In one variation, the process comprises a method for detoxifying an aqueous solution containing cyanide. The method involves adding a source of silicon oxide to the aqueous solution, in a concentration of 0.001 to 10 g silicon dioxide/liter aqueous solution, at an alkaline pH and a temperature of from 10° to 100° C., and adding hydrogen peroxide or another peroxygen compound in a sufficient quantity to convert the aqueous solution containing cyanide to an aqueous solution containing environmentally less toxic materials.

DETAILED DESCRIPTION OF THE INVENTION

In carrying out the present invention, a source of silicon oxide is added to the waste aqueous, cyanide-containing solution in a concentration of 0.001 to 10 g silicon dioxide/liter aqueous solution, at an alkaline pH and a temperature of from 10° to 100° C.; preferably 0.005 to 5 g silicon dioxide/liter aqueous solution, most preferably 0.01 to 1.5 g silicon dioxide/liter aqueous solution.

Before, during or after addition of the source of silicon oxide to the aqueous solution, there is added hydrogen peroxide or another peroxygen compound in sufficient quantity to oxidize any or all of the cyanide present in the aqueous solution. The pH of the aqueous solution can vary depending on the nature of the cyanide-containing waste water and can typically be between 7 to 12, preferably 7 to 10.

A commercially available aqueous sodium silicate solution (29% SiO) in concentrations between 0.1 gram per liter and 30 grams per liter, preferably 0.5 gram per liter to 10 grams per liter, is added to an aqueous solution containing cyanide at a pH between 8 and 12 and a temperature from 10° to 100° C., preferably from 15° to 80° C., more preferably 20° to 55° C. Alternatively, the catalyst can be hydrophilic silicon dioxide powder of the types consisting of amorphous precipitated silicon dioxide, fumed amorphous silicon dioxide, sodium aluminosilicate, calcium silicate, diatomaceous earth, ground quartz, trydimite, crystobalite, perlite, or other powdered high surface area silica type material. Generally the surface area of such substances is in the range of 25 to 650 square meters per gram. The silica component is added to the waste water at a concentration of 0.001 to 10 grams per liter of aqueous waste solution, preferably 0.005 to 5 grams per liter, more preferably 0.01 to 1.5 gram per liter. Preferably pyrogenic silicon dioxide powder is used. The pH of the aqueous solution can be 7 to 12. It is preferable that the silicon dioxide powder must be capable of dissolving under the reaction conditions.

Other peroxygen compounds that are capable of being a source of peroxide and that can be used include sodium perborate, sodium percarbonate, and sodium or ammonium persulfate. These substances are well known in the art. The concentration of hydrogen peroxide or other peroxygen compound added is 1 to 10 times or more the stoichiometric amount required for the reaction, as necessary to achieve the desired reaction rate, preferably 5 to 10 times the stoichiometric amount. Reaction times at 10×stoichiometry is generally one hour, at 6×stoichiometry the reaction time is generally three hours.

The reaction which takes place in the system according to the invention can be represented by the following:

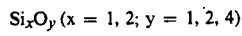
$$Si_xO_y (x = 1, 2; y = 1, 2, 4)$$

$$NaCN + H_2O_2 \longrightarrow NaOCN + H_2O$$

$$NaOCN + 2H_2O \longrightarrow NH_4^+ + CO_3^{2-}$$

The method can be carried out as either a batch or continuous process.

The sodium silicate usually precipitates out of solution as a colloidal suspension of unknown composition near the end of the reaction. However, it is expected that this precipitated material is colloidal silicon dioxide and other silicate precipitates. Additional tests with precipitated and fumed silicon dioxide rendered similar effects. Filtration may or may not be required before the aqueous solution can be discharged. Filters known in the art can be utilized.

The catalyst used is generally nontoxic, readily available and inexpensive. Sodium silicate is used as a major ingredient in detergent manufacturing and many other products. As such, it is produced in large quantities all over the world. This means it has a long history of human exposure. It is inexpensive, it is easy to remove from suspension by simple means, or can be discharged with the treated water because it is a naturally occurring material similar to sand. The oxidation of cyanide by peroxide is enhanced by the use of this catalyst, which makes this process more practical and inexpensive for an industrial wastewater treatment plant than current techniques. It may also have application for other oxidation reactions.

Copper sulfate, on the other hand, is highly toxic. It is quite soluble. Elaborate removal techniques are usually required after the cyanide detoxification, which involve the use of a metal precipitating agent and disposal of hazardous sludge.

EXAMPLES

Example 1

300 ml samples of an industrial wastewater effluent containing 435 ppm total cyanide, 430 WAD cyanide, pH 9.5-10.0 was placed in a glass reaction vessel and maintained at 50° C. A three ml aliquot of sodium silicate 50 Be' (1.526 g/ml) was added with stirring. Hydrogen peroxide (50% w/w) was added at 10 times the stoichiometric amount (2.8 ml). The reaction was monitored by a silver/thalamide oxidation reduction potential electrode. The reaction was completed in 30 minutes. It consumed 1900 mg/l $H_2O_2$, or 41.3%. The final cyanide concentration was 5.7 ppm.

Example 2

300 ml samples of an industrial wastewater effluent containing 435 ppm total cyanide, 430 WAD cyanide, pH 9.5-10.0 was placed in a glass reaction vessel and maintained at 35° C. A three ml aliquot of sodium silicate 50 Be' was added with stirring. Hydrogen peroxide (50% w/w) was added at 6 times the stoichiometric amount (1.69 ml). The reaction was monitored by an oxidation reduction potential electrode. The reaction was completed in 190 minutes. It consumed 1600 mg/l $H_2O_2$, or 58%. The final cyanide concentration was 7.3 ppm.

Example 3

300 ml samples of an industrial wastewater effluent containing 435 ppm total cyanide, 430 WAD cyanide, pH 9.5-10.0 was placed in a glass reaction vessel and maintained at 35° C. A nine ml aliquot of sodium silicate 50 Be' was added with stirring. Hydrogen peroxide (50% w/w) was added at 6 times the stoichiometric amount (1.69 ml). The reaction was monitored by an oxidation reduction potential electrode. The reaction was completed in 180 minutes. It consumed 1710 mg/l $H_2O_2$, or 62%. The final cyanide concentration was 11.9 ppm.

Example 4

300 ml samples of an industrial wastewater effluent containing 435 ppm total cyanide, 430 WAD cyanide, pH 9.5-10.0 was placed in a glass reaction vessel and maintained at 35° C. A nine ml aliquot of sodium silicate 50 Be' was added with stirring. Hydrogen peroxide (50% w/w) was added at 10 times the stoichiometric amount (2.82 ml). The reaction was monitored by an oxidation reduction potential electrode. The reaction was completed in 60 minutes. It consumed 1260 mg/l $H_2O_2$, or 27.4%. The final cyanide concentration was 3.1 ppm.

Example 5

300 ml samples of an industrial wastewater effluent containing 435 ppm total cyanide, 430 WAD cyanide, pH 7.5 was placed in a glass reaction vessel and maintained at 25° C. A 0.5 ml aliquot of sodium silicate 50 Be' was added with stirring. Hydrogen peroxide (50% w/w) was added at 10 times the stoichiometric amount (2.82 ml). The reaction was monitored by an oxidation reduction potential electrode. The reaction was completed in 60 minutes. It consumed 2100 mg/l $H_2O_2$, or 45.6%. The final cyanide concentration was 4.1 ppm.

Example 6

300 ml samples of an industrial wastewater effluent containing 435 ppm total cyanide, 431 WAD cyanide, pH 9.5-10.0 was placed in a glass reaction vessel and maintained at 35° C. One gram of precipitated silicon dioxide (50-450 square meters per gram) was added with stirring. Hydrogen peroxide (50% w/w) was added at 10 times the stoichiometric amount (2.82 ml). The reaction was monitored by an oxidation reduction potential electrode. The reaction was completed in 60 minutes. It consumed 1500 mg/l $H_2O_2$, or 32.6%. The final cyanide concentration was 8 ppm.

| Batch # | Peroxide v/v % × stoich. | | Catalyst ml ppm | | Temp °C. | Time min. | CN- ppm |
|---|---|---|---|---|---|---|---|
| | | | None | | | | |
| 1 | 0.94 | 10 | | 0 | RT | 120 | 29 |
| 2 | 0.94 | 10 | | 0 | RT | 120 | 30 |
| 3 | 0.47 | 5 | | 0 | 50 | 128 | 42 |
| 4 | 0.47 | 5 | | 0 | 60 | 111 | 41 |
| | | | Copper | | | | |
| 5 | 0.47 | 5 | | 24 | 35 | 30 | 44 |
| 6 | 0.47 | 5 | | 10 | 35 | 84 | 46 |
| 7 | 0.47 | 5 | | 20 | 35 | 48 | 55 |
| 8 | 0.94 | 10 | | 25 | 60 | 2.5 | 40 |
| 9 | 0.47 | 5 | | 0 | 35 | 240 | 88 |
| | | | Silicate | | | | |
| 10 | 0.56 | 6 | 9 | | 35 | 180 | 11 |
| 11 | 0.56 | 6 | 3 | | 35 | 190 | 7 |
| 12 | 0.94 | 10 | 6 | | 50 | 30 | 6 |
| 13 | 0.94 | 10 | 9 | | 35 | 60 | 3 |
| 14 | 0.94 | 10 | 9 | | 35 | 60 | 3.1 |
| 15 | 0.94 | 10 | 1 | | 35 | 53 | 10.4 |
| 16 | 0.94 | 10 | 3 | | 35 | 37 | 11.2 |
| | pH change to 8, after one hour | | | | | | |
| 17 | 0.94 | 10 | * | | 35 | 50 | 10.1 |
| 18 | 0.94 | 10 | 3 | | 35 | 56 | 8.06 |
| | Raised pH to 10.5 for 1st half hour, then lowered to 8 | | | | | | |
| 19 | 0.94 | 10 | 3 | | 35 | 90 | 10 |
| | Raised pH to 10.5, but did not change after 1st half hour. | | | | | | |

*0.1 g of fumed silicon dioxide powder added equaling 0.09999 g $SiO_2$ or 0.02977 g/l.

SUMMARY OF ALL TREATMENTS

One times the stoichiometric amount required=0.282 ml 50% peroxide per 300 ml sample.

Starting concentration of cyanide—434 ppm; pH 9.6.

Peroxide is shown as % of peroxide (50% concentration) per volume of sample (ml/ml %).

This data shows that when no catalyst is used, the time of reaction is very long (2 hours+) and the reaction is incomplete (29 to 42 ppm CN- remaining). When copper catalyst is used, the reaction time is shorter (as little as 2.5 minutes) but the reaction is also incomplete (40+ ppm CN- remaining). However, when the silicate solution is added, the reaction time is short (as little as 30 minutes) and the reaction progresses nearly to completion (3.1 to 11 ppm CN- remaining).

Further variations and modifications of the invention will become apparent to those skilled in the art from the foregoing and are intended to be encompassed by the claims appended hereto.

What is claimed is:

1. A method for detoxifying an aqueous waste solution containing cyanide, said method comprising adding a source of silicon oxide to said aqueous waste solution, in a concentration of 0.001 to 10 g silicon dioxide/liter aqueous waste solution, at an alkaline pH and a temperature of from 10° to 100° C., and adding hydrogen peroxide or another peroxygen compound in a sufficient quantity to convert said aqueous waste solution containing cyanide to an aqueous solution containing environmentally less toxic materials.

2. The method according to claim 1, wherein said concentration of said source of silicon dioxide is 0.005 to 5 g/liter aqueous waste solution.

3. The method according to claim 2, wherein said concentration of said source of silicon dioxide is 0.01 to 1.5 g/liter aqueous waste solution.

4. The method according to claim 1, wherein said temperature is from 15° to 40° C.

5. The method according to claim 1, wherein said temperature is from 20° to 55° C.

6. The method according to claim 1, wherein said source of silicon dioxide is a sodium silicate solution in a concentration of 0.1 to 30 g/liter aqueous waste solution.

7. The method according to claim 6, wherein said concentration of sodium silicate solution is between 0.5 gram per liter to 10 g/liter aqueous waste solution.

8. The method according to claim 1, wherein said pH is from 7 to 9.

9. The method according to claim 1, wherein said pH is from 10 to 12.

10. The method according to claim 1, wherein said source of silicon dioxide is 0.001 to 10 g/liter aqueous waste solution of a silicon dioxide powder selected from the group consisting of amorphous precipitated silicon dioxide, fumed amorphous silicon dioxide, sodium alumino-silicate, calcium silicate, diatomaceous earth, ground quartz, crystobalite, perlite, mica, and other powdered high surface area silica material in the range of 25 to 650 square meters per gram.

11. The method according to claim 10, wherein said silicon dioxide powder is added at a concentration of 0.005 to 5 grams per liter.

12. The method according to claim 11, wherein said silicon dioxide powder is added at a concentration of 0.01 to 1.5 gram per liter.

13. The method according to claim 1, wherein said hydrogen peroxide or other peroxygen compound is added at 1 to 10 times the stoichiometric amount.

14. The method according to claim 13, wherein said hydrogen peroxide or other peroxygen compound is added at 5 to 10 times the stoichiometric amount.

* * * * *